United States Patent [19]

Cain et al.

[11] 4,042,283

[45] Aug. 16, 1977

[54] PILLOW BLOCK

[75] Inventors: Earl S. Cain, Portola Valley; Jerome A. Carlson, Woodside; George E. Goodrich, San Carlos, all of Calif.

[73] Assignee: Tribotech, Redwood City, Calif.

[21] Appl. No.: 664,163

[22] Filed: Mar. 5, 1976

[51] Int. Cl.² .......................................... F16C 35/12
[52] U.S. Cl. ........................................ 308/15; 308/72; 308/207 R
[58] Field of Search ............... 308/15, 29, 189 A, 194, 308/72, 73

[56] References Cited

U.S. PATENT DOCUMENTS

| 2,794,691 | 6/1957 | Noe | 308/72 |
| 3,871,723 | 3/1975 | Pray | 308/15 |
| 3,941,436 | 3/1976 | Kazama | 308/72 |

Primary Examiner—Richard A. Bertsch

[57] ABSTRACT

A pillow block for mounting bearings formed from one piece of metal.

10 Claims, 8 Drawing Figures

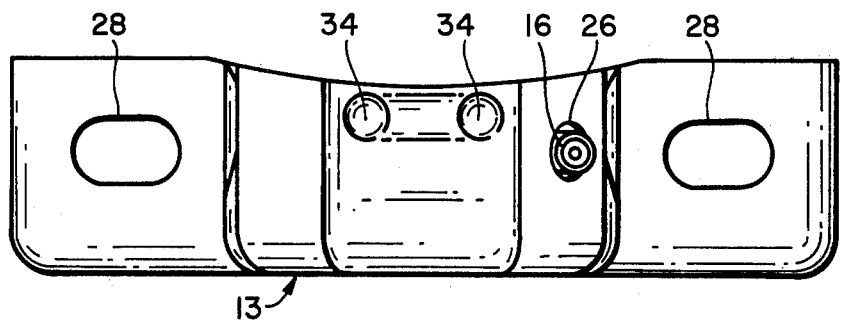
FIG_2
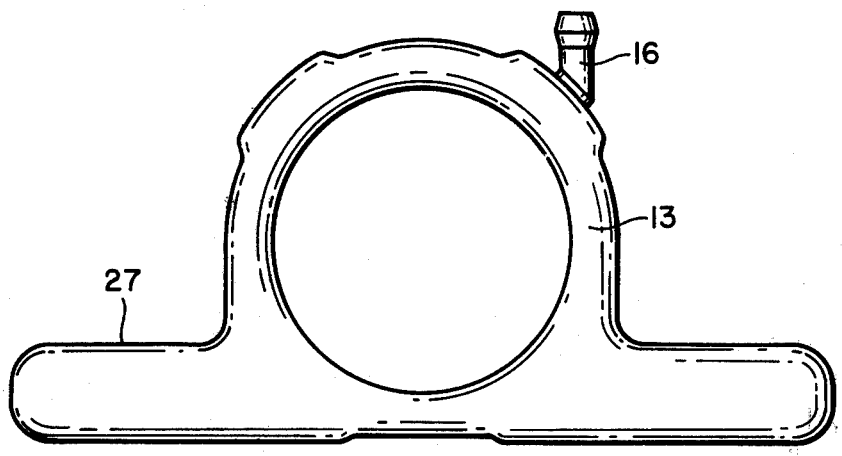
FIG_1
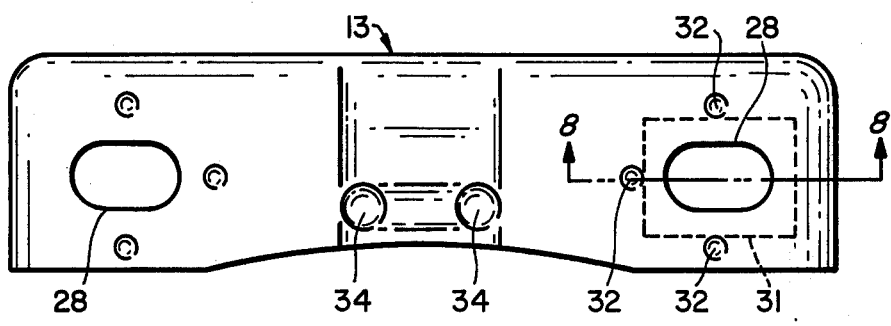
FIG_3

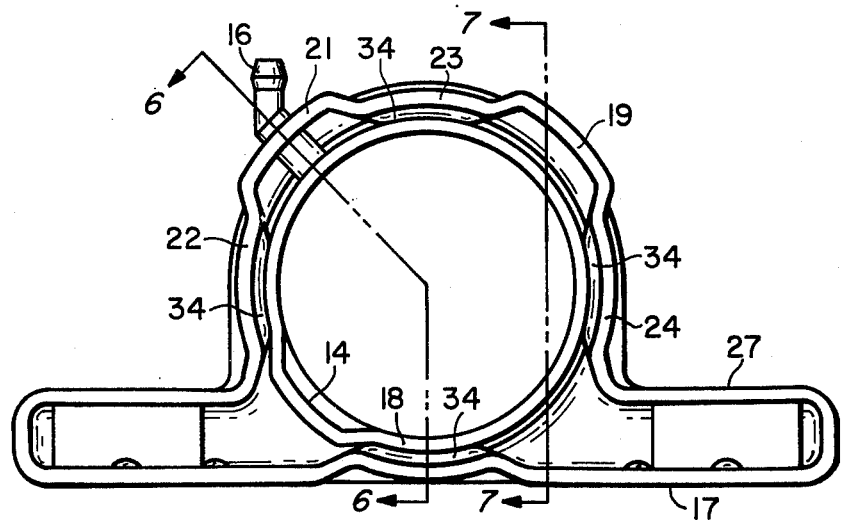
FIG_4
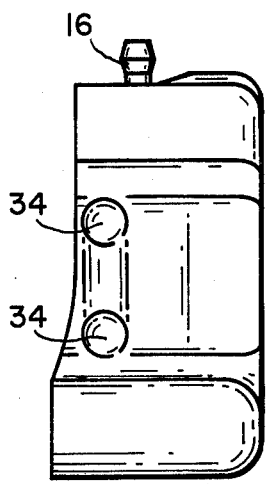
FIG_5
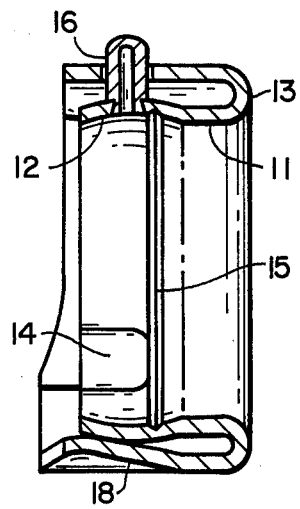
FIG_6
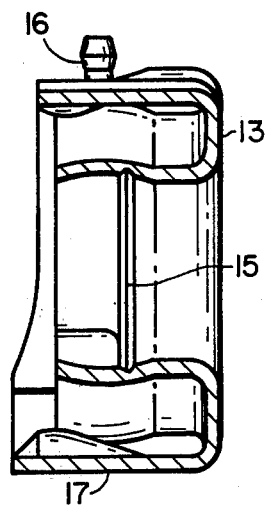
FIG_7
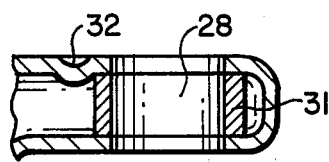
FIG_8

PILLOW BLOCK

REFERENCE TO RELATED APPLICATION

In our copending application entitled "Bearing Mount", Ser. No. 492,214, filed July 26, 1974, now U.S. Pat. No. 3,966,275 there is described and claimed a one-piece metal bearing mount which can serve as a flange, pillow block or take-up mount for self-aligning bearings.

BACKGROUND OF THE INVENTION

This invention relates generally to a pillow block and more particularly to a one-piece metal pillow block.

Present day pillow blocks are primarily of two types: one-piece machine castings in gray, ductile or malleable iron, and two-piece stamped sheet metal pillow blocks. There are also a few light-duty stamped, plastic or rubber-lined units available.

The cast types are relatively expensive to process through the steps of casting and machining to provide a bearing mount having tolerances compatible with the typical heavy duty service for which they are applicable. Generally, they can only be mounted by bolts and the surface on which they are mounted must be flat or the pillow block may fracture when the bolts are tightened. The most popular types are cast iron which are sensitive to shock loads.

Typical of the prior art stamped units are those shown in U.S. Pats. Nos. 2,467,994; 2,654,645; and 3,552,808. In all instances these pillow blocks are formed of lightweight material and are of two or more piece construction. These pillow blocks are primarily used for light-duty applications.

OBJECTS AND SUMMARY OF THE INVENTION

It is a general object of the present invention to provide a strong one-piece metal pillow block mounting unit.

It is another object of the present invention to provide a relatively inexpensive pillow block bearing mounting unit which can be used in heavy duty applications.

It is a further object of the present invention to provide a pillow block with a bearing mounting flange which is supported for radial, thrust and twist loads.

It is another object of the present invention to provide a pillow block which can be welded in place.

These and other objects of the invention are provided by a pillow block formed from plate or sheet material with a bearing receiving flange extending outwardly from one face thereof to receive and hold a bearing with the outer edges of the plate bent in the same direction as the flange to provide mounting surface generally parallel to the axis of the flange and other surfaces adjacent to the flange with portions which engage the flange to provide support and portions spaced from the mounting surface to define therewith outwardly extending mounting feet.

BRIEF DESCRIPTION OF THE DRAWINGS

FIG. 1 is a back elevational view of a pillow block in accordance with the invention.
FIG. 2 is a plan view of the pillow block.
FIG. 3 is a bottom view of the pillow block.
FIG. 4 is a front elevational view of the pillow block.
FIG. 5 is a side elevational view of the pillow block.
FIG. 6 is a sectional view taken along the line 6—6 of FIG. 4.
FIG. 7 is a sectional view taken along the line 7—7 of FIG. 4.
FIG. 8 is an enlarged partial view taken along the portion 8—8 of FIG. 3.

DESCRIPTION OF PREFERRED EMBODIMENT

Referring particularly to the figures, the pillow block shown is formed from a single sheet or plate metal piece as, for example, by multi-stage forming in a press with appropriate dies or by bending and welding and other methods of forming. The preferable mount is the type shown and formed as a unitary structure from a single sheet of material by stamping, drawing, forming and pressing.

The mount includes a bearing mounting flange 11 whose inner surface 12 is substantially a surface of revolution to accommodate and hold an associated bearing. The flange 11 is formed by pressing the center of a sheet of material to extend outwardly from one face 13 thereof. The inner surface of revolution 12 of the flange 11 preferably includes a spherical surface adapted to receive and hold a bearing having a spherical outer surface. The bearing is mounted in the spherical surface by inserting the bearing into the bearing receiving flange through mounting slot 14, FIGS. 4 and 6, and then rotating the bearing so that its axis is perpendicular to the face 13. The spherical bearing seat, as is well known, provides means whereby the bearing can be aligned with an associated shaft even when the axis of the pillow block is not accurately aligned with regard to the axis of the associated shaft. In accordance with one embodiment of the invention, the flange includes grease groove 15 which communicates with a lubrication fitting 16. The fitting may be swaged in place.

After the flange is formed, the outer portions of the plate are formed or bent substantially as shown in the drawings. When the outer portions are bent, the resulting pillow block will include a mounting base 17 extending in the same direction and parallel to and spaced from the bearing flange. The central portion of the base is bent upwardly whereby it engages and surrounds the lower portion of the flange 11 as shown at 18. The other edges of the plate are bent as shown to provide portions which surround and are spaced from the periphery of the flange such as portions 19 and 21 and portions 22, 23 and 24 which are bent inwardly to engage the flange to thereby provide a rigid beam support for the flange and provide a relatively strong, light weight pillow block. The grease fitting is seen as extending through an opening 26 formed in the spaced portion 21. Portions 27 of the plate extend adjacent the base 17 to define therewith mounting channels or feet. Elongated openings 28 are formed in the channels and preferably a spacer 31 is inserted in the channed formed by the base 17 and portion 27. The base material is pressed or formed at a plurality of places as shown at 32 to retain the spacers. Preferably, the adjacent portions of the plate which engage the flange are bent by suitably press forming the material such as shown at 34 in the drawings.

In summary, the spherical bearing set or flange is formed in the general center of a plate by projecting the material from one face thereof. The periphery of the plate is then folded to lie adjacent the bearing flange. It is bent inwardly at selected positions to engage the exterior of the flange to substantially enhance the radial and thrust loading capacity of the flange. It is also bent to form mounting feet. This integral assembly enhances the load carrying capability in the radial, thrust and twisting directions. By varying the gauge and size, an economical light weight, strong pillow block can be obtained. The production costs are substantially less than the prior art pillow blocks. Sensitivity to shock, mounting surface flatness, and structural twisting are substantially improved in the illustrated and described stong and ductile steel bearing mount. The bearing mount can accommodate misalignment of the shaft and block because of the spherical mounting surface. The bearing mount can be welded in place since the material is compatible with the material of the structures on which it is mounted. The pillow block can be used to retain not only self-aligning bearings, but also non-self-aligning bearings, bushings single and double row bearings or other low friction means.

What is claimed is:

1. A pillow block including a bearing receiving flange extending outwardly from one face of a plate and adapted to receive and hold a bearing, the outer edges of said plate being bent to extend in the same direction as said flange, one portion of said bent outer edges forming a mounting surface generally parallel to the axis of the flange to provide a mounting base and other portions extending adjacent to said flange with spaced portions of said adjacent extending portions bent inwardly toward said flange to engage and support the flange.

2. A pillow block as in claim 1 wherein said outer edges include a portion bent adjacent said portion forming a mounting base to define therewith mounting channels.

3. A pillow block as in Claim 1 including a spacer disposed in said mounting channels.

4. A pillow block including a bearing receiving flange extending outwardly from one face of a plate and adapted to receive and hold a bearing, said bearing receiving flange including a bearing mounting slot for inserting said bearing, the outer edges of said plate being bent to extend in the same direction as said flange, one portion of said bent outer edges forming a mounting surface generally parallel to the axis of the flange to provide a mounting base and other portions extending adjacent to and closely surrounding said flange for stiffening.

5. A pillow block including a substantially cylindrical bearing receiving flange formed in a plate of material and extending from one face thereof, said flange serving to receive a low friction bearing means, the outer edges of said plate being formed to extend in the same directions as said bearing receiving flange, said edges including a portion which extends closely adjacent to and surrounds a substantial portion of said bearing receiving flange with portions of the ends thereof bent inwardly to engage the end of said bearing receiving flange to engage and support the flange, another portion of said edges extending parallel to the axis of the bearing receiving flange and defining a mounting base.

6. A pillow block as in claim 5 wherein said formed outer edges include a portion spaced from said mounting base to define therewith a mounting channel.

7. A pillow block as in claim 6 including spacers disposed in said mounting channels.

8. A pillow block as in claim 5 wherein said cylindrical bearing receiving flange is spherical to receive spherical bearing.

9. A pillow block as in claim 5 wherein said spherical bearing mounting flange includes a lubrication groove in its inner surface and a lubrication fitting secured to said flange and communicating with said groove.

10. A pillow block as in claim 5 in which said bearing receiving flange includes a bearing mounting slot.

* * * * *